US007433514B2

(12) United States Patent  (10) Patent No.: US 7,433,514 B2
Sloan  (45) Date of Patent: Oct. 7, 2008

(54) TONE MAPPING OF HIGH DYNAMIC RANGE IMAGES

(75) Inventor: Rocklin J. Sloan, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 679 days.

(21) Appl. No.: 11/180,768

(22) Filed: Jul. 13, 2005

(65) Prior Publication Data

US 2007/0014470 A1    Jan. 18, 2007

(51) Int. Cl.
    *G06K 9/00*    (2006.01)
(52) U.S. Cl. .................. 382/167; 382/162; 382/166; 382/168
(58) Field of Classification Search .......... 382/162, 382/164, 166, 167, 168; 345/589–605; 348/453–459
    See application file for complete search history.

(56) References Cited

U.S. PATENT DOCUMENTS

| 6,141,459 | A | 10/2000 | Gendel ................. 382/256 |
| 6,285,798 | B1 | 9/2001 | Lee ..................... 382/260 |
| 6,897,876 | B2* | 5/2005 | Murdoch et al. ........... 345/589 |
| 7,058,234 | B2* | 6/2006 | Gindele et al. ........... 382/274 |
| 2002/0171852 | A1* | 11/2002 | Zhang et al. ............ 358/1.9 |
| 2004/0066980 | A1* | 4/2004 | Gindele et al. ........... 382/274 |
| 2004/0109179 | A1 | 6/2004 | Haikin et al. ............. 358/1.9 |
| 2004/0264799 | A1 | 12/2004 | Gallagher et al. .......... 382/256 |
| 2005/0047648 | A1 | 3/2005 | Newman et al. ........... 382/162 |
| 2005/0047654 | A1 | 3/2005 | Newman et al. ........... 382/167 |

OTHER PUBLICATIONS

Daniel J. Jobson, et al., "A Multiscale Retinex for Bridging the Gap Between Color Images and the Human Observation of Scenes" IEEE Transactions on Image Processing, vol. 6, No. 7, pp. 965-976, Jul. 1997.

Patrick Ledda, "Development of a Perceptual Tone Mapping Operator" University of Bristol, pp. 1-26, available at http://aris-ist.intranet.gr/documents/Tone%20Mapping%20and%20High%20Dinamic%20Range%20Imaging.pdf.

Ruifeng Xu, et al., "High Dynamic Range Image Display Using Level Set Framework", Journal of WSCG, vol. 11, No. 1., 8 pages, Feb. 3-7 2003.

Gustav J. Braun, et al., "Image Lightness Rescaling Using Sigmoidal Contrast Enhancement Functions", Munsell Color Science Laboratory, pp. 1-39, available at http://www.cis.rit.edu/people/faculty/fairchild/PDFs/PAP07.pdf.

(Continued)

*Primary Examiner*—Matthew C. Bella
*Assistant Examiner*—Ali Bayat
(74) *Attorney, Agent, or Firm*—Fitzpatrick, Cella, Harper & Scinto

(57) ABSTRACT

Tone mapping a high dynamic range (HDR) image is performed by obtaining a log-norm luminance component based on a normalized logarithm of the HDR image. The log-norm luminance component is flattened (tone-compressed) using incrementally-spaced adaptation levels, which are increasingly blurrier representations of the log-norm luminance component, weighted by a diminishing factor. Visual cues are restored by injecting a proportion of values of the log-norm luminance component, applying histogram tail clipping, and applying a sigmoid curve mapping, to create a restored luminance component. A tone-compressed image is obtained by mapping luminance of the HDR image using the restored luminance component and adjusting saturation of the mapped HDR image.

19 Claims, 18 Drawing Sheets

OTHER PUBLICATIONS

G. Yourganov, et al., "Tone-Mapping for High Dynamic Range Images", Dept. Of Computer Science, York University, 12 pages, Dec. 2001, available at http://www.cs.yorku.ca/~wolfgang/papers/TR_tonemapping.pdf.

U.S. Appl. No. 09/443,796, filed Nov. 19, 1999, Todd Newman et al.

U.S. Appl. No. 09/540,012, filed Mar. 31, 2000, John S. Haikin et al.

* cited by examiner

TONE MAPPING OF HIGH DYNAMIC RANGE IMAGES

BACKGROUND

1. Field of the Invention

This invention pertains to tone mapping of high dynamic range images, and specifically to tone compression by multi-scale homomorphic filtering using incrementally-spaced adaptation levels weighted by a diminishing factor and applying restored visual cues.

2. Related Background Art

The human eye has a large dynamic range and is capable of dynamically adjusting to a portion of a scene that is only $1/10,000$ as bright as the brightest point in the field of view. Present day technology can create image files that have this high dynamic range (HDR), and such images have become useful in many industries, including medical and computer-generated imagery. However, most computer display and printing devices are limited to a useful dynamic range of about 100:1, much less than the range of luminance values of an HDR image.

Tone mapping techniques can compress the dynamic range of HDR images for viewing on a standard, low dynamic range device, but current techniques have drawbacks. Most of these techniques use a single adaptation level or, alternatively, a small set of arbitrary adaptation levels, which are expensive in terms of processing speed. In addition, the resultant images often are plagued by edge and halo artifacts, lack a realistic look, appear unnaturally illuminated, or lack clarity. Finally, the quality and effectiveness of the results of these techniques are often dependent on the content of the original HDR image and must be adjusted on a per-image basis.

SUMMARY

To address the foregoing, the present invention accomplishes tone compression of an HDR image using an efficient approach that produces consistent flattening (tonal compression) with enhanced visual cues. At the same time, the present invention reduces ringing artifacts, such as edge and halo artifacts, and the noticeable haziness and loss of contrast that results from many tonal compression techniques.

Specifically, the present invention obtains a log-norm luminance component based on a normalized logarithm calculated from the HDR image. The log-norm luminance component is flattened using a plurality of incrementally-spaced adaptation levels, which are increasingly blurrier representations of the log-norm luminance component, weighted by a diminishing factor to create a flattened luminance component. The adaptation levels are evenly spread throughout the adaptive range, resulting in consistent flattening with reduced dependence on image content, particularly when many adaptation levels are used.

The adaptation levels are obtained by a computationally efficient pyramid-type technique using small kernel convolutions to generate each successive adaptation level from the previous one. This can include padding the log-norm luminance component to a larger size of $2n+1$, where n is a positive integer. A first adaptation level is obtained by reducing the log-norm luminance component to create a first reduced image and expanding the first reduced image to the size of the log-norm luminance component. Reducing the log-norm luminance component can be accomplished by applying a small convolution filter and removing every other row and every other column. Expanding the first reduced image can be accomplished by adding a blank row between each row of the first reduced image and a blank column between each column of the first reduced image, applying a small convolution filter, and multiplying each pixel by 4. The use of small convolution filters allows this reduction/expansion process to be performed quickly and efficiently.

A second adaptation level is obtained by reducing the first reduced image to create a second reduced image and expanding the second reduced image to the size of the log-norm luminance component. The same reduction process described above can be used to create the second reduced image from the first reduced image. Accordingly, the first reduced image is reduced from the log-norm luminance component by the same factor as the second reduced image is reduced from the first reduced image, which results in evenly spread adaptation levels well-suited to a universal approach. Many adaptation levels can be quickly and efficiently created in this manner. In addition, only the most recent reduced image need be kept after each iteration, for use in obtaining the next adaptation level. For example, the first reduced image can be discarded after creation of the second reduced image, resulting in an "on the fly" method of obtaining adaptation levels. Furthermore, if the size of the current reduced image reaches a lower limit of effectiveness, for example, three or fewer rows or three or fewer columns, the process can automatically cease generating additional adaptation levels.

Each of the adaptation levels is subtracted from the log-norm luminance component, the difference is weighted, and the weighted differences are accumulated to create the flattened luminance component. The weights are obtained using a diminishing factor. The use of the diminishing factor allows a tapering-off effect for successive adaptation levels, which is helpful in reducing ringing artifacts, such as edge and halo artifacts, and other noise and clarity problems. At the same time, the diminishing factor allows deeper adaptation levels to contribute to the overall tone compression.

For example, the first adaptation level is subtracted from the log-norm luminance component to obtain a first reflectance map. The first reflectance map is multiplied by a first weight to obtain a first weighted reflectance map. Similarly, the second adaptation level is subtracted from the log-norm luminance component to obtain a second reflectance map. The second reflectance map is multiplied by a second weight to obtain a second weighted reflectance map. The second weight equals the product of the first weight and the diminishing factor. The first and second weighted reflectance maps are accumulated.

Many successive adaptation levels can be created, subtracted from the log-norm luminance component, weighted using the diminishing factor, and accumulated in this manner. Each such weighted reflectance map contributes to create the flattened luminance component, and the weighted reflectance maps can be discarded after accumulation. Previously added padding, if any, is removed from the flattened luminance component. A reflectance contribution of the adaptation levels can be tracked by accumulating the first weight, the second weight, and successive weights.

Visual cues are restored in the flattened luminance component by injecting a proportion of the log-norm luminance component, applying histogram tail clipping, and applying a sigmoid curve mapping, to create a restored luminance component. In contrast to most current tone mapping techniques, which limit the amount of flattening to avoid an over-flattened look, the restoration of visual cues in the present invention allows a higher amount of flattening because subtle visual cues are reintroduced into the flattened image to restore realistic attributes of the illumination. Thus, the limited flattening of current techniques results in an unnatural, low-contrast appearance and is inconsistent between different images, whereas the present invention's use of restored visual cues provides more consistent and image-independent flattening while avoiding an over-flattened look.

In restoring visual cues, a proportion of values of the log-norm luminance component is injected into the flattened luminance image. The proportion injected is based on a pre-designated realism factor and the reflectance contribution of the adaptation levels. The reflectance contribution is determined from the number of adaptation levels and the diminishing factor. Thus, the reflectance contribution can be based on the accumulation of weights discussed above. The proportion of values of the log-norm luminance component is then based on the ratio of the product of the predesignated realism factor and the reflectance contribution to the value of one minus the predesignated realism factor.

The process of restoring visual cues is further enhanced by applying histogram tail clipping and applying a sigmoid curve mapping. A tail clipping at the high end of the luminance scale (top-clip) is performed by generating a histogram of a realism enhanced component based on the above-described step of injecting a proportion of values of the log-norm luminance component. An average point count of bins in a predetermined range from a starting bin is calculated, and the values of the realism enhanced component are clipped based on the value of the starting bin at which the average point count exceeds a high cut threshold. The amount of top-clipping can be adjusted using a predesignated high threshold value, wherein the high cut threshold is determined from an image size, the granularity of the histogram, and a predesignated high threshold value. A sigmoid curve mapping is applied, which helps to remove a hazy appearance and to restore clarity.

A tail clipping at the low end of the luminance scale (bottom-clip) is performed by generating a histogram of the resultant of the sigmoid curve mapping. A lightness key based on a median bin of the histogram and a key range defined by a bottom key value and a top key value are determined. A low cut threshold is based on a predesignated maximum threshold if the lightness key is greater than the top key value, on a minimum threshold if the lightness key is less than the bottom key value, and on a middle value if the lightness key is between the bottom key value and the top key value. The proportion of the middle value between the minimum threshold and the maximum threshold equals the proportion of the lightness key between the bottom key value and the top key value. An average point count of bins in a predetermined range from each of a plurality of starting bins at a low end of the histogram is calculated. The values of the resultant of the sigmoid curve mapping are clipped based on the value of the starting bin whose average point count minimally exceeds the low cut threshold.

The top-clip, sigmoid curve mapping, and bottom-clip can be performed in any order. For example, the order can be top-clip, bottom-clip, sigmoid curve, or sigmoid curve, top-clip, bottom-clip, or other orders.

The restoration of visual cues produces a restored luminance component, which is used to obtain a tone-compressed image. Luminance of the HDR image is mapped using the restored luminance component and adjusting saturation based on a saturation component of the HDR image. The tone-compressed image can be obtained from the restored luminance component in different ways. For example, the restored luminance component can be used to scale components of the HDR image. In another approach, the luminance component of the HDR image can be replaced with the restored luminance component. Likewise, saturation can be adjusted in different ways, for example, by applying a gamma curve and a linear scale factor.

The invention may be embodied in a method, apparatus or computer-executable program code. The computer-executable program code comprises computer-executable instructions stored on a computer-readable medium, and are executable by a computer apparatus to perform the method of the invention. Thus, the invention may comprise a computer-readable medium that stores the computer-executable code, or an apparatus that includes a computer readable medium which stores the computer code, and a processor that executes the computer code.

This brief summary has been provided so that the nature of the invention may be understood quickly. A more complete understanding of the invention can be obtained by reference to the following detailed description in connection with the attached drawings.

DETAILED DESCRIPTION

Embodiments of the present invention are described below with reference to the accompanying drawings. The embodiments describe tone compression by multi-scale homomorphic filtering using incrementally-spaced adaptation levels weighted by a diminishing factor and applying restored visual cues. In general, homomorphic filtering is used to reduce the effect of illumination variations in a scene while emphasizing the reflectance components.

Figures 1, 1A:
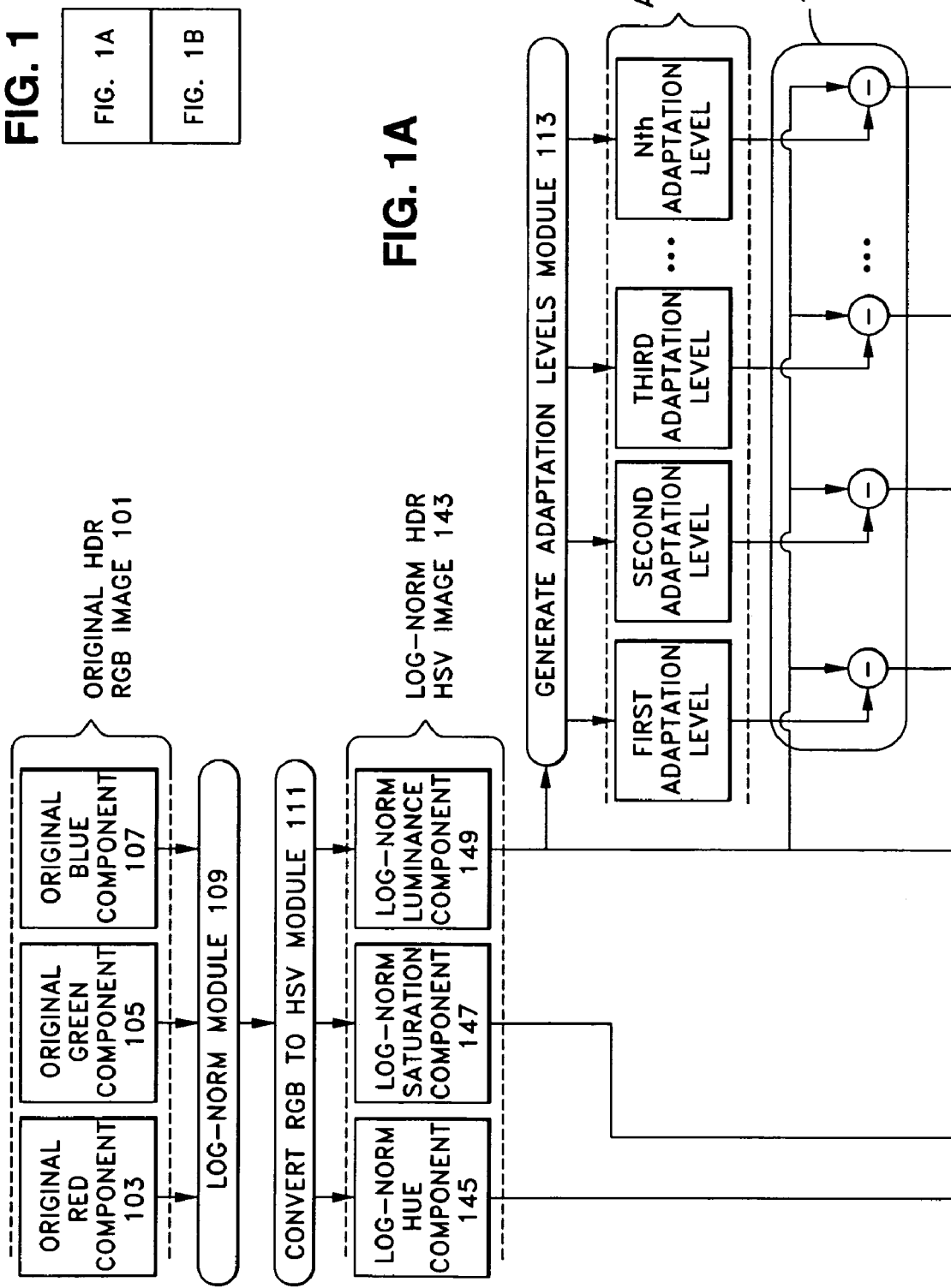
FIG. 1, which includes
FIGS. 1A and 1B, is a procedural and data flow diagram of an HDR tone-mapper according to one embodiment of the present invention.
Figure 1B:
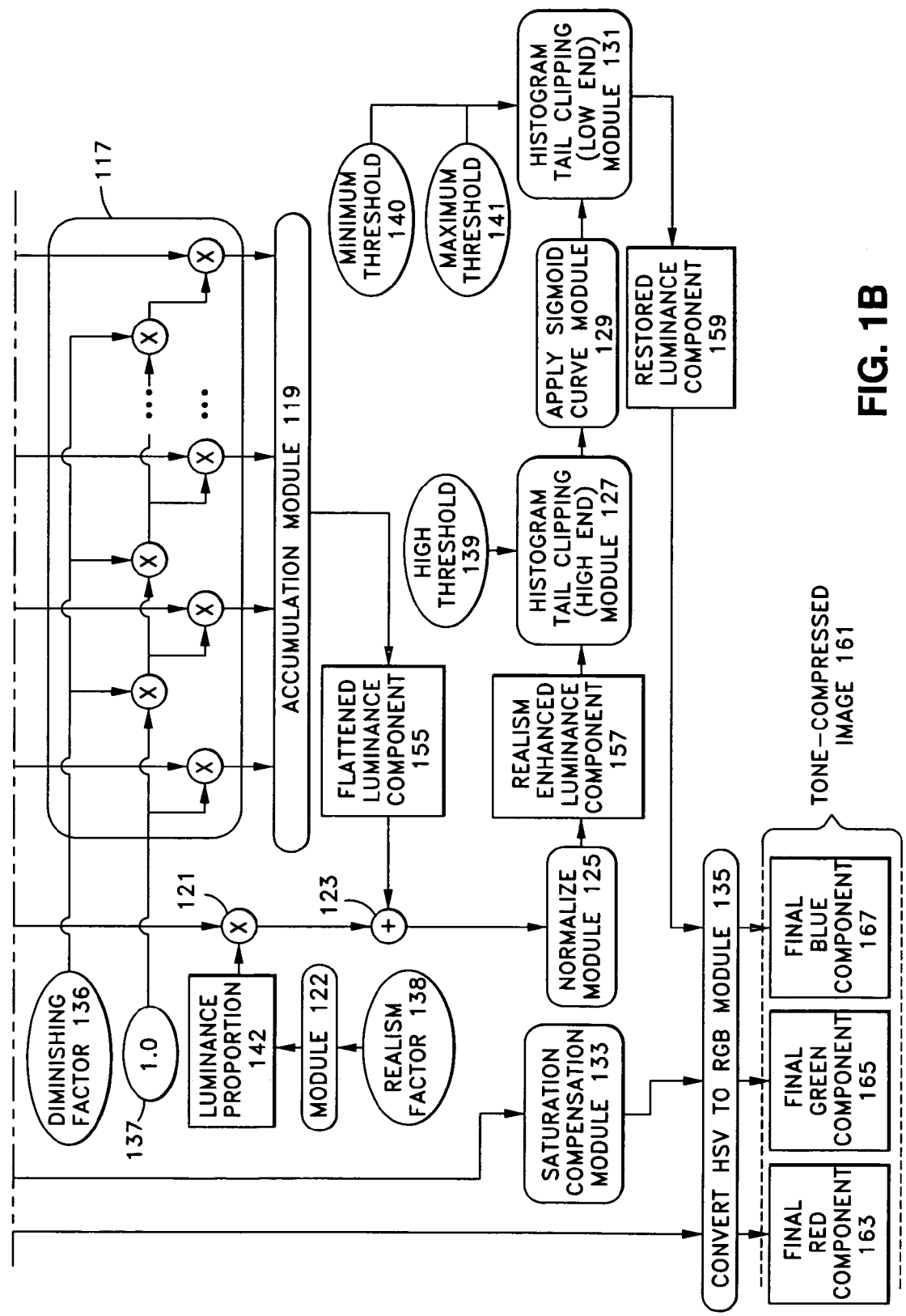

FIG. 1 depicts a procedural and data flow diagram of one embodiment of an HDR tone-mapper according to the present invention, in which an original HDR RGB image 101 in RGB (red, blue, green) format is tone-mapped to produce a tone compressed image 161 in RGB format. FIG. 1 shows the RGB components of original HDR RGB image 101, which are an original red component 103, an original green component 105, and an original blue component 107. Original HDR RGB image 101 is input and processed by processing modules, shown as rounded boxes and circles.

The processing modules in FIG. 1, which are preferably implemented in software, include a Log-Norm Module 109, a Convert RGB to HSV (hue, saturation, luminance) Module 111, a Generate Adaptation Levels Module 113, a Generate Reflectance Maps Module 115, a Weight Reflectance Maps Module 117, an Accumulation Module 119, a Multiplication Module 121, a Luminance Proportion Determination Module 122, an Addition Module 123, a Normalize Module 125, a Histogram Tail Clipping (High End) Module 127, an Apply Sigmoid Curve Module 129, a Histogram Tail Clipping (Low End) Module 131, a Saturation Compensation Module 133, and a Convert HSV to RGB Module 135.

FIG. 1 also depicts predesignated factors used in the process, which are depicted as ellipses. The predesignated factors include a diminishing factor 136, a first weight 137 (shown as "1.0"), a realism factor 138, a high threshold 139, a minimum threshold 140, and a maximum threshold 141. FIG. 1 also depicts intermediate results, which are shown as boxes, created by the processing modules. The intermediate results include a luminance proportion 142, a log-norm HDR HSV image 143 in HSV format, and having a log-norm hue component 145, a log-norm saturation component 147, and a log-norm luminance component 149. Also shown are adaptation levels 153, which includes a first adaptation level through an Nth adaptation level, a flattened luminance component 155, a realism enhanced luminance component 157, a restored luminance component 159, and tone compressed image 161 having a final red component 163, a final green component 165, and a final red component 167.

The HDR tone-mapper of FIG. 1 obtains log-norm luminance component 149 of original HDR RGB image 101 using Log-Norm Module 109 and Convert RGB to HSV Module 111. Log-norm luminance component 149 is then flattened (tone-compressed) using a plurality of incrementally-spaced adaptation levels 153 weighted by diminishing factor 136 to produce flattened luminance component 155. Specifically, log-norm luminance component 149 is input to Generate Adaptation Levels Module 113, which generates a plurality of adaptation levels 153. Generate Reflectance Maps Module 115 generates a reflectance map for each adaptation level by subtracting the adaptation level from log-norm luminance image 149. Weight Reflectance Maps Module 117 weights the reflectance maps, using first weight 137 and diminishing factor 136 to decrease the weight of each successive reflectance map. The resulting weighted reflectance maps are accumulated by Accumulation Module 119 to produce flattened luminance component 155.

Visual cues are restored in flattened luminance component 155 by injecting a proportion of values of log-norm luminance component 149. Specifically, Luminance Proportion Determination Module 122 calculates Luminance Proportion 142 using realism factor 138. Multiplication Module 121 multiplies log-norm luminance component 149 by Luminance Proportion 142, and Addition Module 123 adds the result to flattened luminance component 155. The result is then normalized by Normalize Module 125 to obtain realism enhanced luminance component 157.

Histogram Tail Clipping (High End) Module 127 clips the high end of realism enhanced luminance component 157, using high threshold 139 to adjust the amount of clipping. Apply Sigmoid Curve Module 129 applies a sigmoid curve to the result. Histogram Tail Clipping (Low End) Module 131 then clips the low end, using minimum threshold 140 and maximum threshold 141 to adjust the amount of clipping, to create restored luminance component 159.

Tone-compressed image 161 is obtained using restored luminance component 159 to map the luminance of original HDR RGB image 101. Specifically, restored luminance component 159 is input into Convert HSV to RGB Module 135. Saturation Compensation Module 133 adjusts the saturation of log-norm saturation component 147, and the resultant saturation component is input into Convert HSV to RGB Module 135. Log-norm hue component 145 is input into Convert HSV to RGB Module 135, and Convert HSV to RGB Module 135 then converts the inputs into the RGB components final red component 163, final green component 165, and final blue component 167, which form tone-compressed image 161.

FIG. 2A, FIG. 2B, FIG. 2C, FIG. 2D, and FIG. 2E detail the process described above in a process flowchart for HDR tone mapping according to the embodiment of the present invention depicted in FIG. 1. The operation of the embodiment will now be described in reference to FIG. 1 and the process flowchart.

Figure 2A:
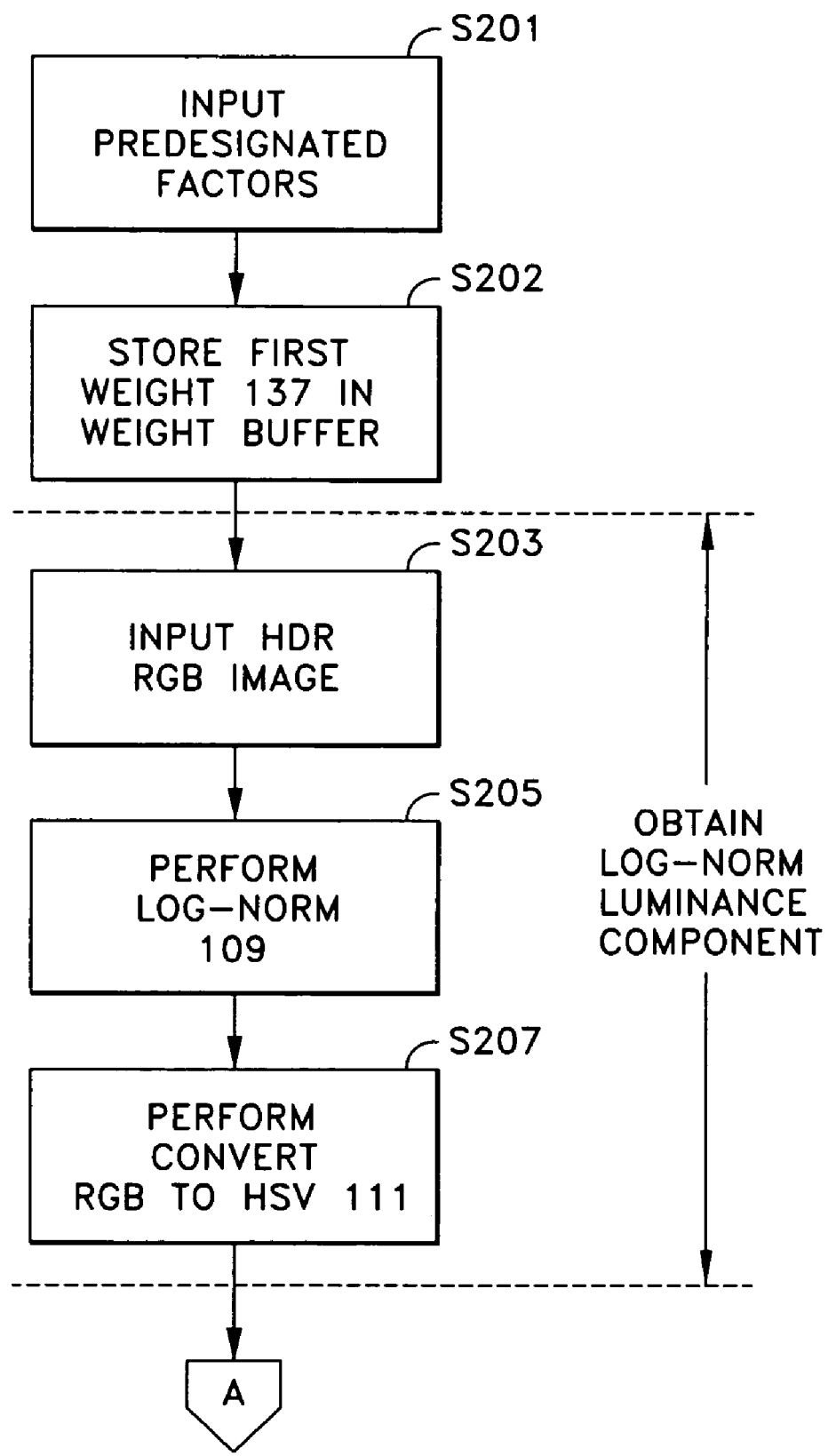
FIG. 2A, FIG. 2B, FIG. 2C, FIG. 2D, and FIG. 2E depict a process flowchart of a method for tone mapping an HDR image according to one embodiment of the present invention.

Referring to FIG. 2A, predesignated values are obtained for diminishing factor 136, first weight 137, realism factor 138, high threshold 139, minimum threshold 140, maximum threshold 141, and a level limit (not shown on FIG. 1) are input (S201), or these values are elsewise initialized such as through user input. Other predesignated values, such as sigmoid curvature, sigmoid centering, saturation scale factor, and saturation gamma can also be input. First weight 137 is stored (S202) in a WEIGHT buffer.

Next, a log-norm luminance component based on a normalized logarithm calculated from original HDR RGB image 101 is obtained, as depicted in S203 to S207. Original HDR RGB image 101 is input (S203), each RGB pixel being represented by three floating point values. Log-Norm Module 109 generates (S205) a normalized logarithm of original HDR RGB image 101 by performing a logarithmic transformation on the image, which helps to restore the image to a more linear space (HDR files are stored in a space more akin to the Human Visual System, with more detail at the dark end), and then normalizing so that all of the values are between 0 and 1. Once the log-norm values for the image have been obtained, log-norm luminance component 149 is derived for the image. In this embodiment, for example, Convert RGB to HSV Module 111 converts (S207) the image from RGB format to HSV format where V is the luminance. The resultant image, log-norm HDR HSV image 143, includes log-norm hue component 145, log-norm saturation component 147, and log-norm luminance component 149. Other methods of deriving a luminance component include, for example, converting the image to Lab, Jab, JCh, or any space where lightness/luminance can easily be extracted, computing the luminance directly from the RGB values using a luminance equation (e.g. L=0.3R+0.59G+0.11B), and other techniques.

Next, the log-norm luminance component is flattened using a plurality of incrementally-spaced adaptation levels weighted by a diminishing factor to create a flattened luminance component. This process is accomplished using Generate Adaptation Levels Module 113, Generate Reflectance Maps Module 115, Weight Reflectance Maps Module 117, and Accumulation Module 119 as detailed in steps S209 to S235 in FIG. 2B through FIG. 2D and described below. This processing is repeated to generate and process each adaptation level, until a desired number of levels has been reached, or until the generation of the adaptation levels reaches a lower limit of effectiveness.

Multiple adaptation levels, which consist of successively blurrier representations of the log-norm luminance component of the HDR image, are generated. The creation of each level can be performed by the use of a convolution filter kernel (e.g. Gaussian Blur). The larger the kernel, the more coverage of the filter, which makes it more blurred. This could be done in many ways, including the method of applying continuously larger Gaussian filter (convolution) kernels to create each blurrier image level. However, increasingly larger Gaussian filter kernels require increasingly more computation time.

Figure 9:
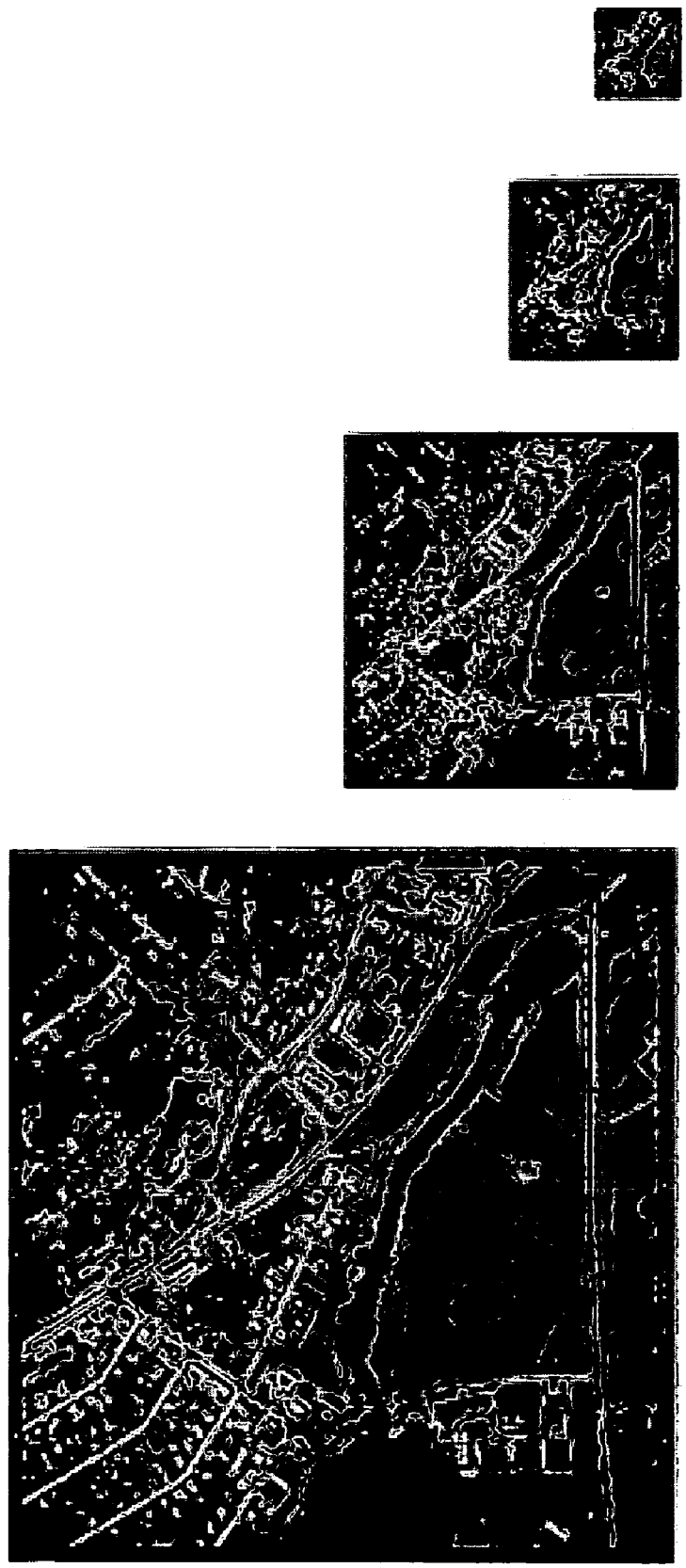
FIG. 9 is an example of an image pyramid (successive downsamples of a source image).

In the present embodiment, a series of image reduce/expand operations are performed (in a pyramid-like fashion) to generate an incrementally-spaced series of luminance adaptations (blurrier images). Image pyramids are successively downsampled renditions of a source image (basically multiple resolutions of the same image, see FIG. 9 for an example). If an image is reduced, then expanded, it will be back to its original size, but will be slightly blurred as if a small convolution filter had been applied. The advantage gained is when multiple reduce operations are performed, and the same number of expand operations are subsequently performed, the result is a same-size image but with the effect of a large convolution having been applied (e.g. 50×50 Gaussian Blur), which would have otherwise been very expensive computationally. The embodiment uses this method to efficiently apply the convolutions, making use of all of the intermediate convolutions "on-the-fly."

In other words, instead of a few arbitrary adaptation levels, an image pyramid-like method is used "on-the-fly" to implement an incremental adaptation down to any level. This is not an image pyramid per se, but an approach that reduces and expands to efficiently generate successive adaptation levels. This embodiment uses a standard method of filtering, in this case using a mirroring technique to create a border and subsequently applying a 5×5 Gaussian blur filter kernel. As detailed below, the embodiment uses this image pyramid-like technique to create the incrementally-spaced adaptations (blurry images) in an efficient manner, using and discarding each adaptation upon creation of the next level.

Figure 2B:
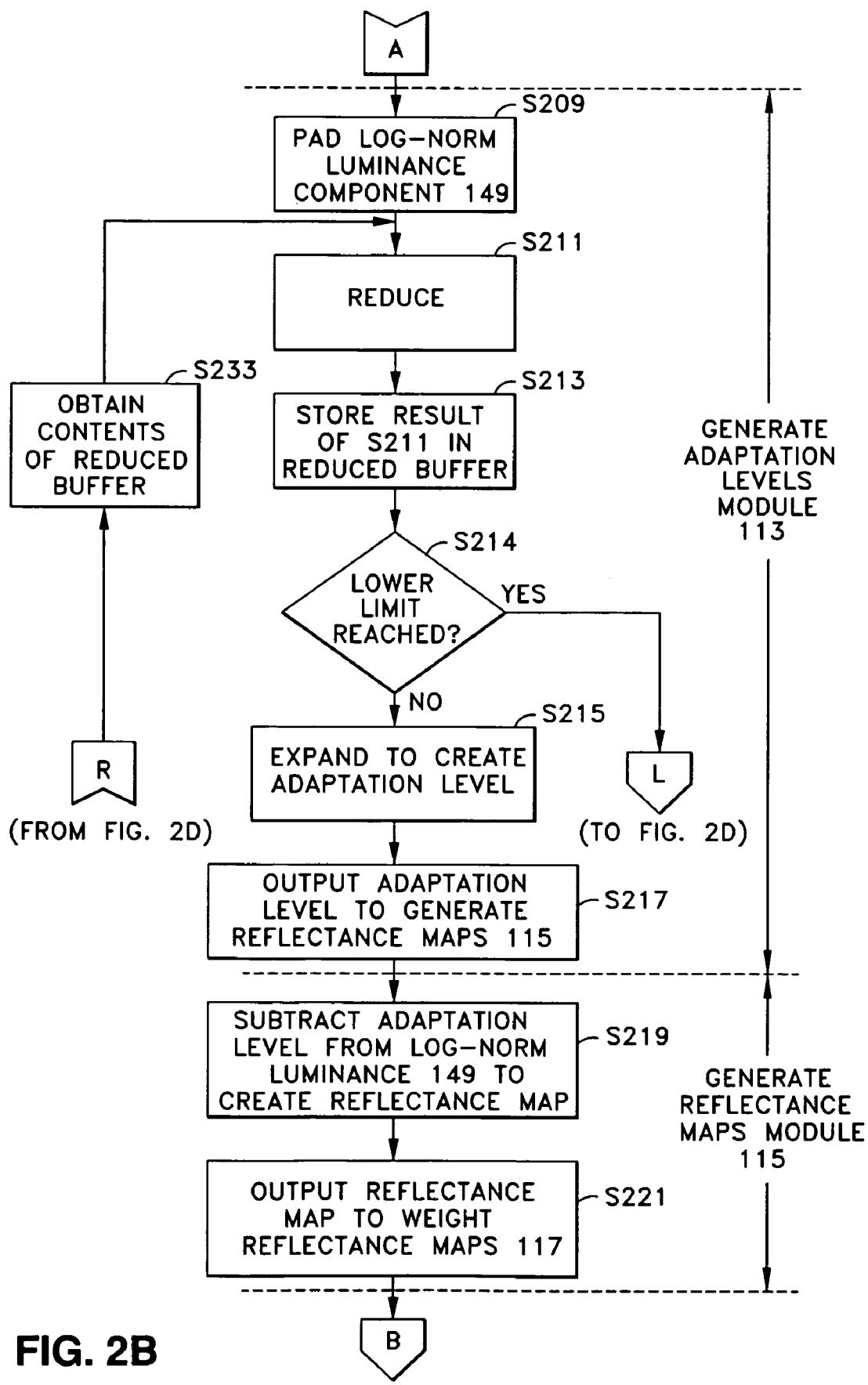

Specifically, Generate Adaptation Levels Module 113, which is used to create a plurality of adaptation levels, is detailed in steps S209 to S217, and S233 of FIG. 2B. Referring now to FIG. 2B, log-norm luminance component 149 is padded (S209) in each dimension to the next larger size 2n+1, where n equals a positive integer. The padded component is reduced (S211), and the reduced component is stored (S213) in a REDUCED buffer. If the contents of the REDUCED BUFFER reaches a lower limit of effectiveness, for example, if the current reduced component has three or fewer rows or three or fewer columns (S214), the process advances to S234, else the process proceeds to S215. The reduced component is expanded (S215) to full size to create the first adaptation level, which is output (S217) to Generate Reflectance Maps Module 115. As described below, each subsequent adaptation level is created by taking the contents of the REDUCED buffer, further reducing it, storing this further reduced component back into the REDUCED buffer, then expanding the further reduced component until it is the same size as log-norm luminance component 149. This will, in effect, supply a series of "blurrier" full size images (which are the adaptation levels).

Figure 3:
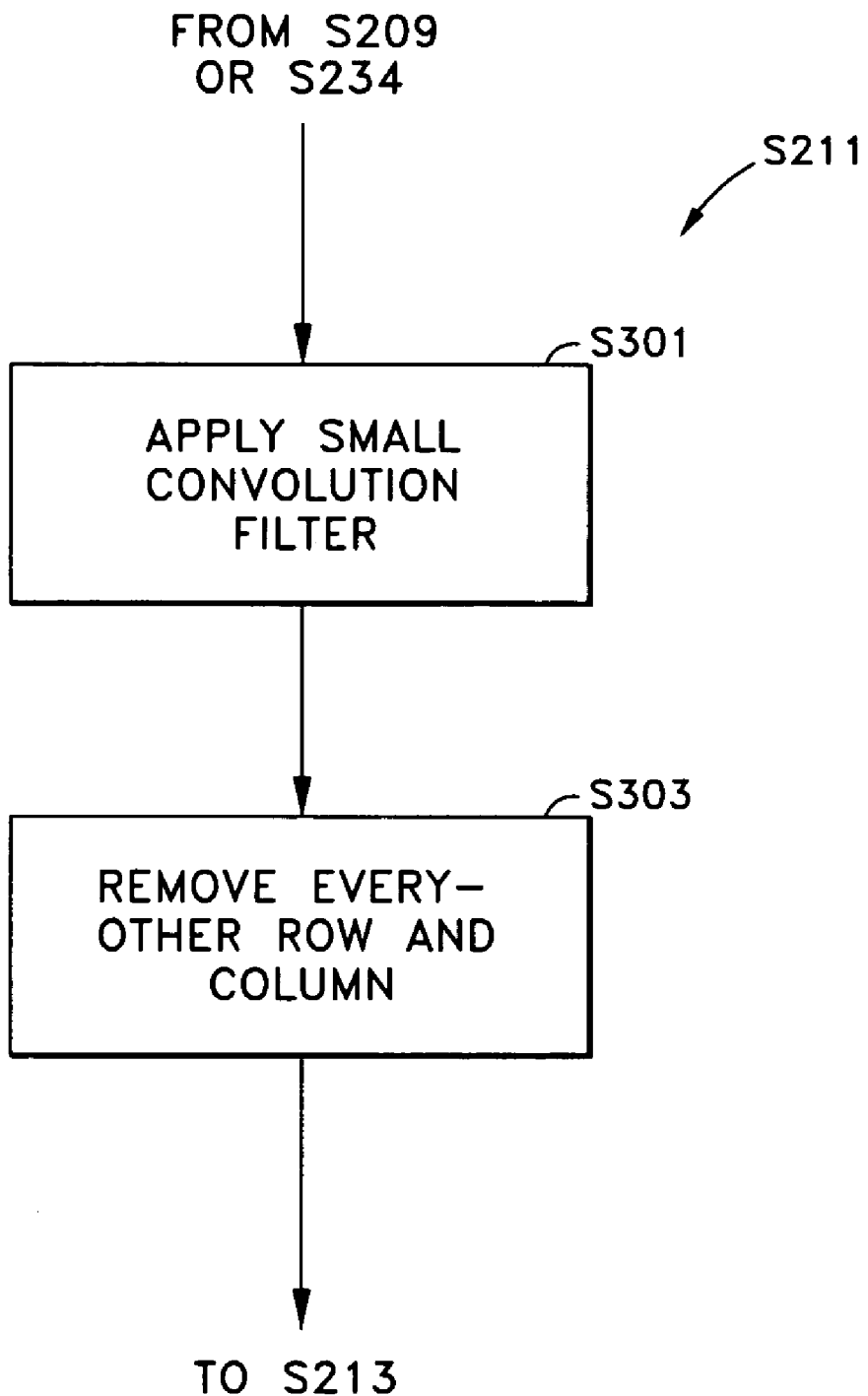
FIG. 3 is a process flowchart of a reduce operation performed according to one embodiment of the present invention.

FIG. 3 is a more detailed depiction of the reduce operation performed in S211. Referring to FIG. 3, a small convolution filter (e.g. 5×5 Gaussian Blur) is applied (S301) to the input component, then every other row and every other column is removed (S303). The reduce operation of S211 will reduce an input component to approximately quarter-size (approximately one-half size in each dimension). For example, the reduced dimension can be computed as follows:

Reduced Dimension=((Original Dimension−1)/2)+1

For example, if the original dimension was 9, the reduced dimension would be 5.

Figure 4:
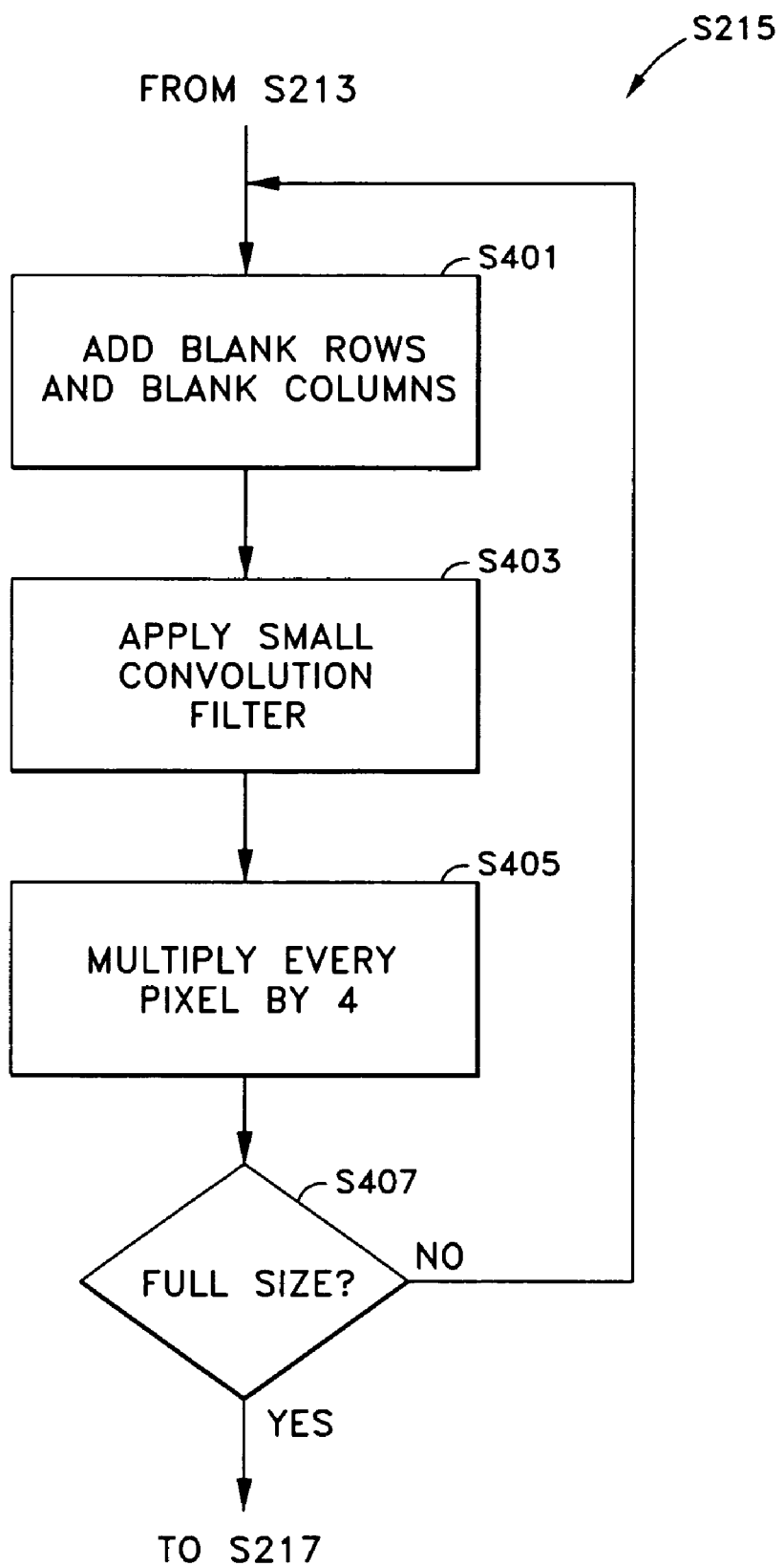
FIG. 4 is a process flowchart of an expand operation performed according to one embodiment of the present invention.

FIG. 4 is a more detailed depiction of the expand operation performed in S215. Referring to FIG. 4, a blank row and a blank column are added (S401) between every row and column of the input component. For example, the expanded dimension can be computed as follows:

Expanded Dimension=((Original Dimension−1)*2)+1

For example, if the original dimension was 5, the expanded dimension would be 9.

A small convolution filter is applied (S403) to the larger result, then every pixel is multiplied (S405) by 4. Steps S401 to S405 will expand the input component to 4 times its size (twice its size in each dimension). For each subsequent adaptation level, steps S401 to S405 are repeated (S407) until the input component is expanded to the same size as log-norm luminance component 149.

For each adaptation level, the adaptation level is then subtracted from the original luminance map. This generates a reflectance map (Luminance−Illumination=Reflectance) for each adaptation level.

Reverting back to FIG. 2B, the operation of Generate Reflectance Maps Module 115 is detailed in steps S219 to S221, showing the creation of the reflectance maps. The adaptation level is subtracted (S219) from log-norm luminance component 149 to create a first reflectance map. The first reflectance map is output (S221) to Weight Reflectance Maps Module 117.

A "diminishing factor" is used to taper off the contribution of reflectance maps generated from coarser adaptation levels. For example, the first adaptation level has a weight of 1 (first weight 137), and if the diminishing factor is 0.8, then subsequent levels would have gain factors of 0.8, 0.64, 0.512, 0.4096, etc. decreasing the effect of each subsequent level. The weights of each level are also accumulated to keep track of the total reflectance contribution of adaptations that are accumulated below.

Figure 2C:
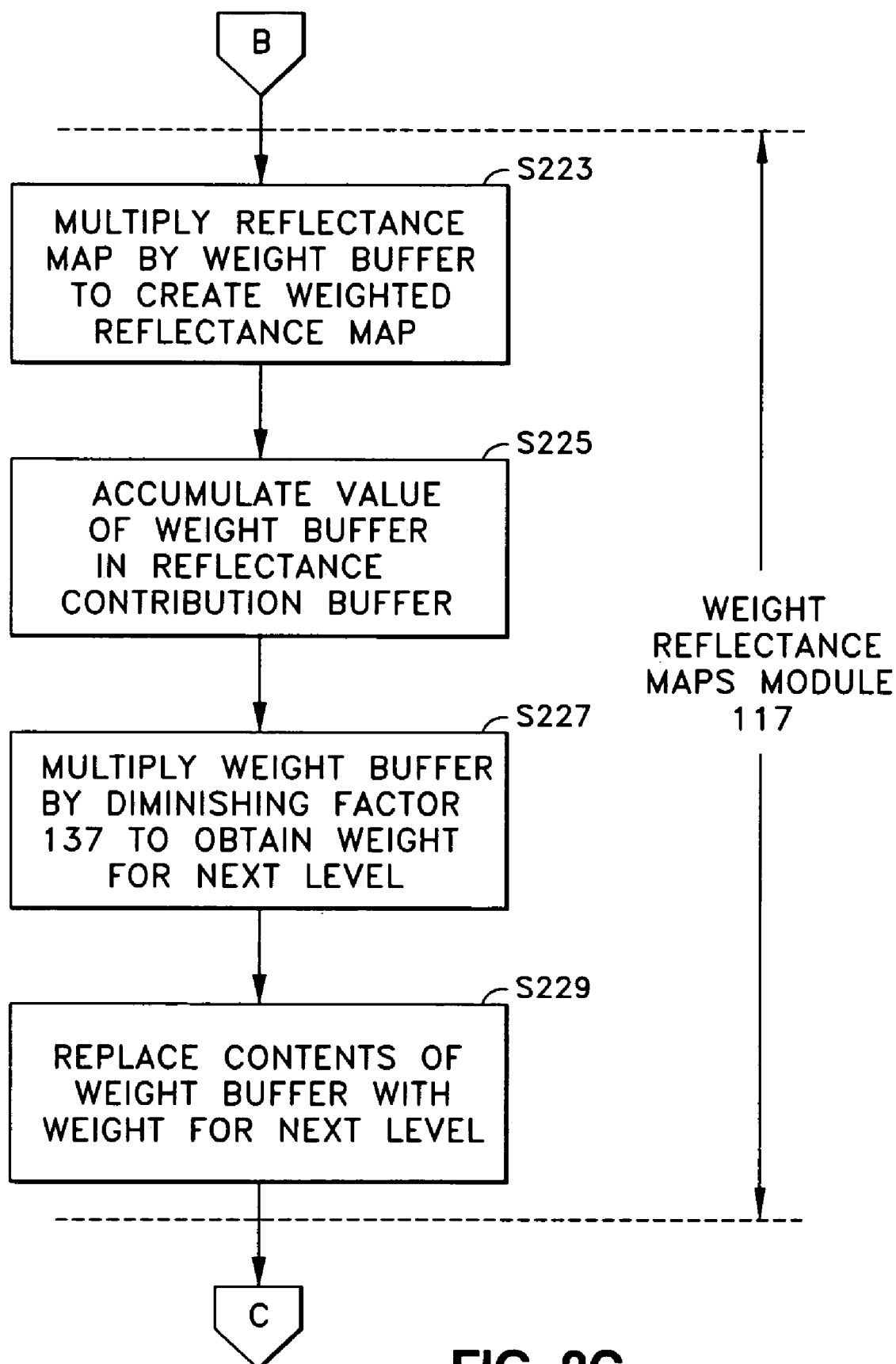

Referring now to FIG. 2C, the operation of Weight Reflectance Maps Module 117 is detailed in steps S223 to S229 of FIG. 2C, showing the creation of weighted reflectance maps. In step S223, the first reflectance map is multiplied by the value stored in the WEIGHT buffer to create a first weighted reflectance map. For the first reflectance map, the value stored in the WEIGHT buffer is first weight 137. The value in the WEIGHT buffer is accumulated (S225) in an REFLECTANCE CONTRIBUTION buffer. The value in the WEIGHT buffer is then multiplied (S227) by diminishing factor 136, and the contents of the WEIGHT buffer are replaced (S229) by the result.

The weighted reflectance maps are accumulated (added) into a working buffer. After a particular adaptation level is accumulated, both the Illumination (blurry picture) and the computed Reflectance can be discarded. Accordingly, this on-the-fly method can result in saving a large amount of memory during operation.

Figure 2D:
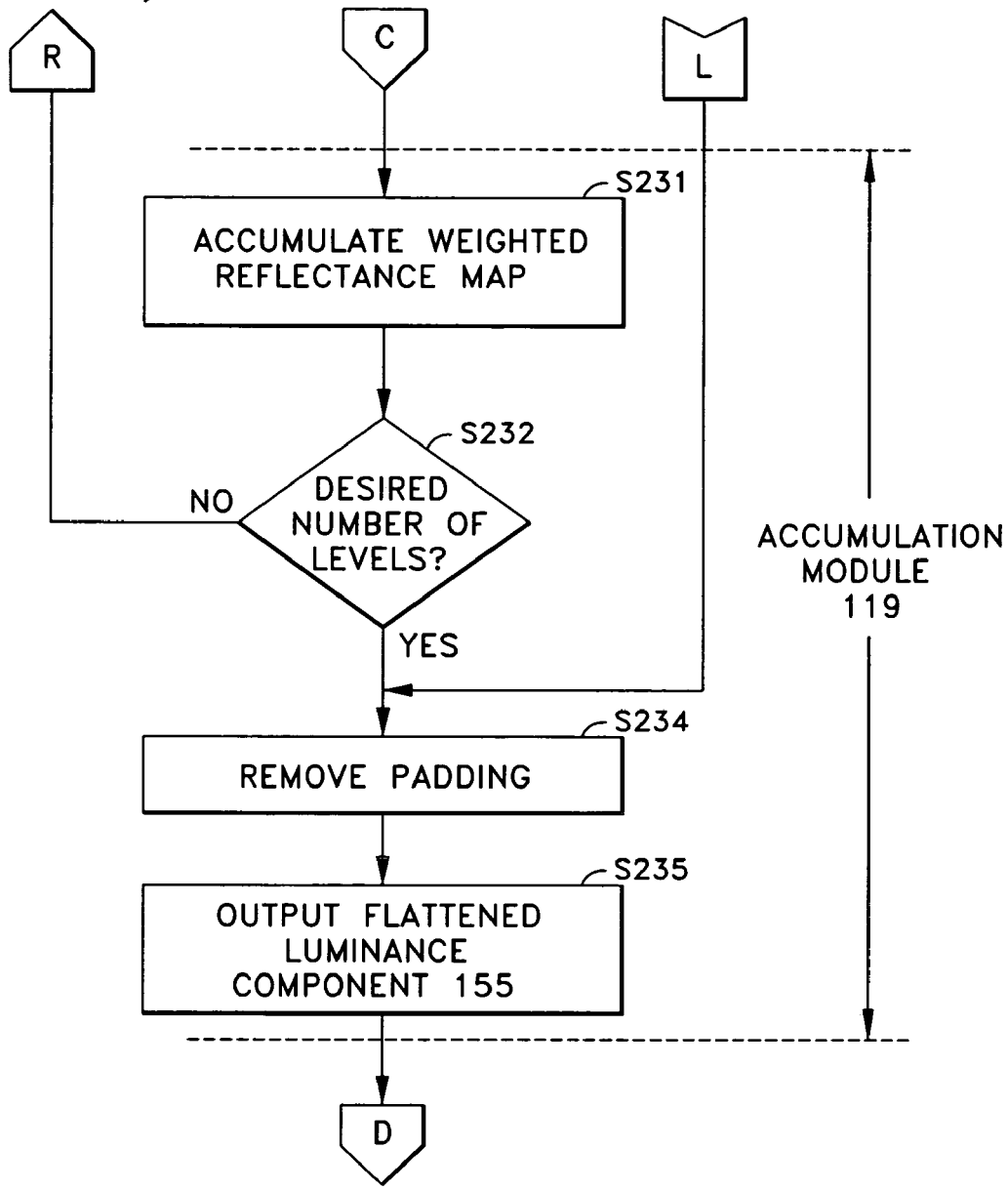

FIG. 2D shows the operation of Accumulation Module 119, in which flattened luminance component 155 is generated by accumulating the weighted reflectance maps. Referring now to FIG. 2D the weighted reflectance map is accumulated (S231) by Accumulation Module 119. If the desired number (level limit) of adaptation levels has not been reached, the process is repeated (S232) to generated a successive adaptation level, reflectance map, and weighted reflectance map. Specifically, the process returns to operations performed by Generate Adaptation Levels Module 113, where the contents of REDUCED buffer are obtained (S233) and input into the reduce operation at S211. If the desired number of adaptation levels has been reached, the padding is removed (S234) and the accumulation of weighted reflectance levels is output (S235) as flattened luminance component 155. Once the desired number of adaptation levels has been reached, the accumulated value in the REFLECTANCE CONTRIBUTION buffer represents the total reflectance contribution of the adaptation levels.

After all of the desired reflectance levels are accumulated, the result is a slightly over-flattened (tonally-compressed) luminance map. This over-flattening is intentional, as it gives a very consistent result from image to image, even for HDR images whose content differs dramatically.

Next, a small proportion of the unfiltered luminance map is re-introduced back into the over-flattened image ("realism injection") to restore visual cues of the scene lighting and provide a natural-looking result, while retaining the tonal compression of the adaptive image pyramid reflectance mapping described above. In addition, the proportion of the unfiltered luminance map that is re-introduced can be easily calculated using the tracked reflectance contribution of each adaptation level and the realism factor.

Figure 2E:
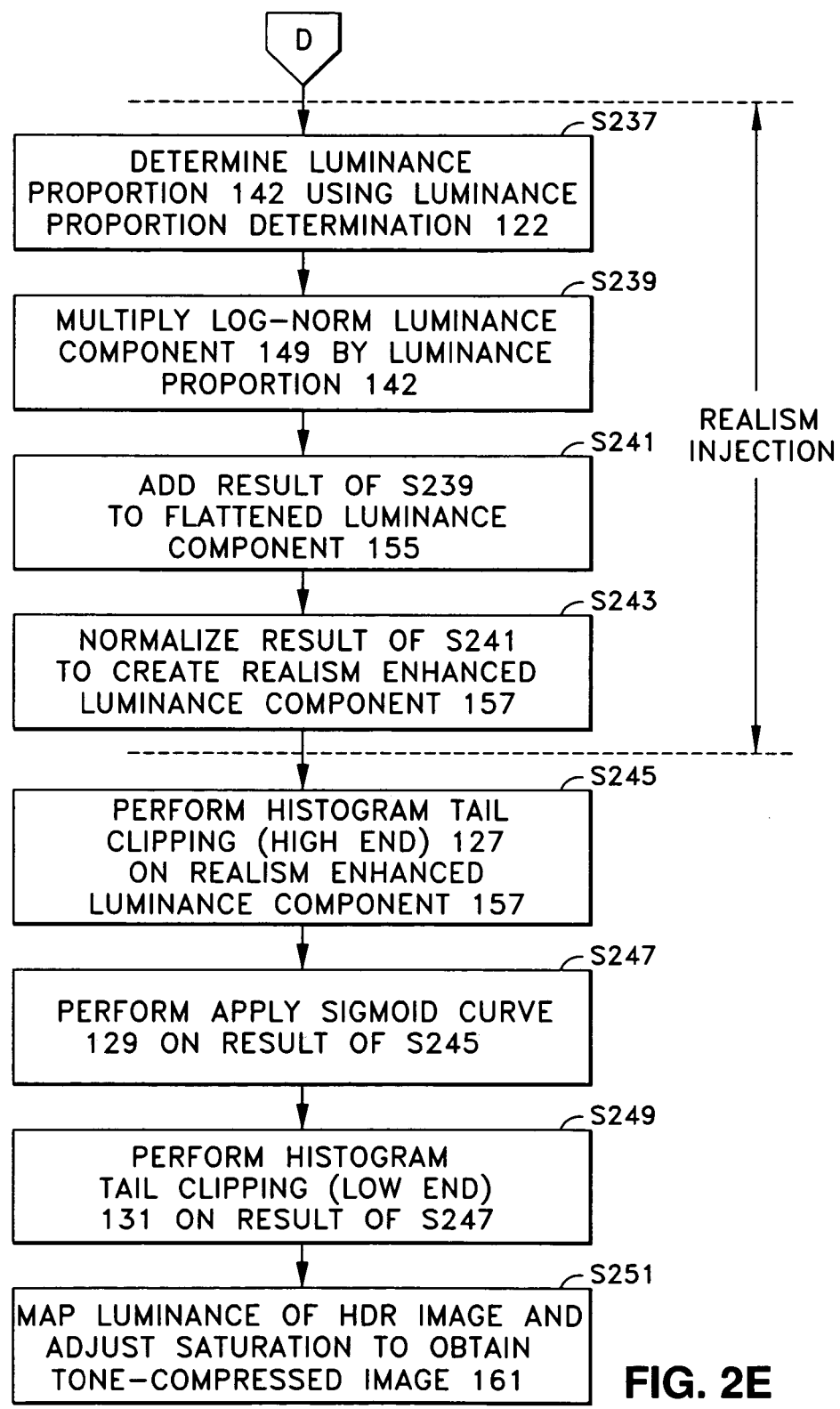

Steps S237 to S243 in FIG. 2E detail the process of injecting a proportion of values of log-norm luminance component 149 into flattened luminance component 155. Referring to FIG. 2E, luminance proportion 142 is determined (S237) using the following equation:

$$LP = RC*(RF/(1-RF)) \quad (1)$$

where: LP=luminance proportion 142
RC=value in REFLECTANCE CONTRIBUTION buffer
RF=realism factor 138 (user input between 0 and 0.99)

This operation is performed in Luminance Proportion Determination Module 122 of FIG. 1.

For example, if RC=3.2 (320% contribution) and RF=0.2 (realism factor 138 input at 20%), then LP=3.2*(0.2/(1−0.2))=0.8. Therefore, a 0.8 proportion of log-norm luminance component 149 would be accumulated with the 3.2 reflectance contribution of the adaptation levels, resulting in a 20% contribution of log-norm luminance component 149 to the resulting realism enhanced luminance component 157.

At step S239, Multiplication Module 121 multiplies log-norm luminance component 149 by luminance proportion 142, and the result is added (S241) to flattened luminance component 155 by Addition Module 123. The result of Addition Module 123 is normalized (S243) by Normalize Module 125 to produce realism enhanced luminance component 157.

Figure 10:
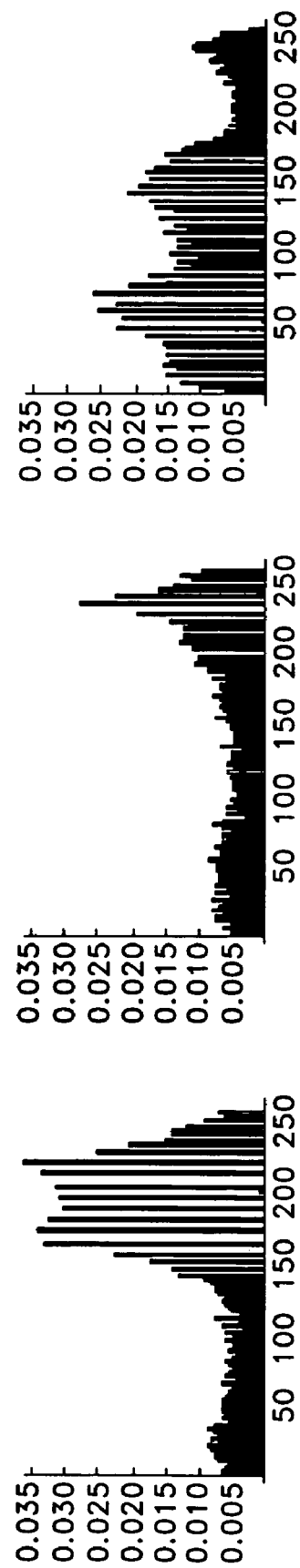
FIG. 10 is an example of a histogram of each of the components of an RGB image.
Figure 11A:
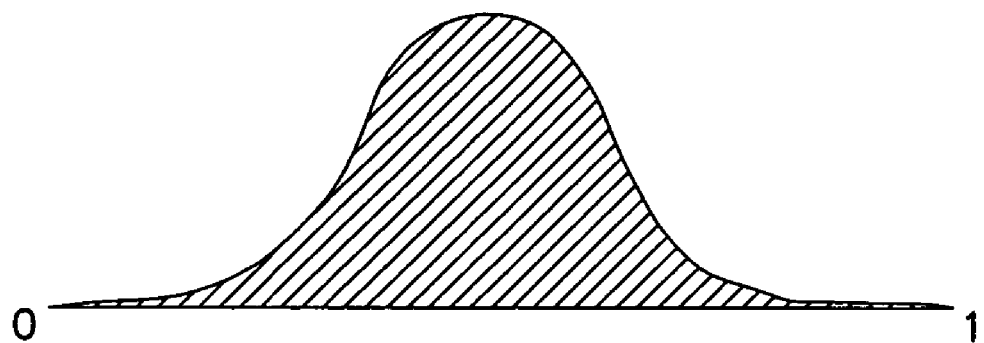
FIGS. 11A and 11B are examples of a histogram before (FIG. 11A) and after (FIG. 11B) tail clipping.
Figure 11B:
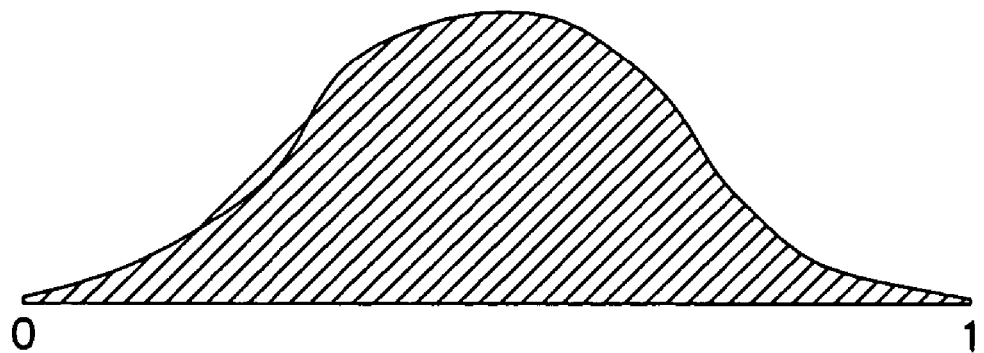

At step S245, Histogram Tail Clipping (High End) Module 127 clips the high end of realism enhanced luminance component 157. First, a histogram of realism enhanced luminance component 157 is generated. A histogram of a component divides the component into intervals in the luminance domain and shows how many pixels are in each interval. The intervals are sometimes referred to as "bins." (See FIG. 10 for an example of a histogram of each of the components of an RGB image). An average point count of bins in a predetermined range from each of a plurality of starting bins at a high end of the histogram is calculated. The values of realism enhanced luminance component 157 are clipped based on the value of the starting bin whose average point count minimally exceeds a high cut threshold, and the clipped component is normalized. (See FIGS. 11A and 11B for examples of a histogram of an image before (FIG. 11A) and after (FIG. 11B) tail clipping).

Figure 5:
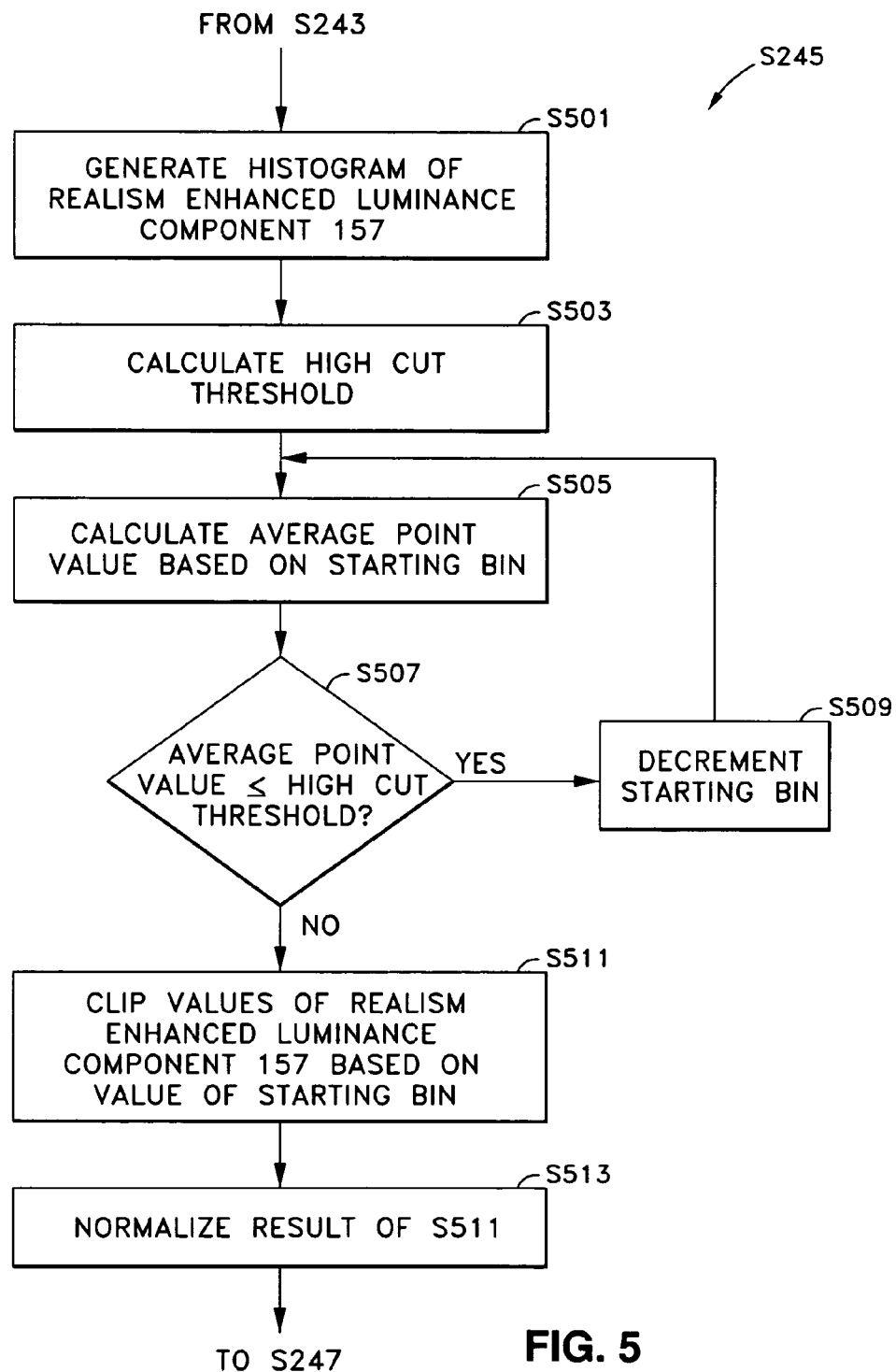
FIG. 5 is a process flowchart of a Histogram Tail Clipping (High End) operation performed according to one embodiment of the present invention.

FIG. 5 is a more detailed depiction of operations performed by Histogram Tail Clipping (High End) Module 127, performed in S245. Referring to FIG. 5, a histogram of realism enhanced luminance component 157 is generated (S501) and used to perform "tail clipping" at the high end of the luminance scale (top-clip). High threshold 139 (user input between 0 and 1) is used to adjust the amount of top-clipping. A high cut threshold is calculated (S503) from high threshold 139 by taking into account the size of realism enhanced luminance component 157 (size=number of pixels=number of rows*number of columns), and the granularity of the histogram (number of bins). Specifically:

$$\text{high\_cut\_threshold} = \frac{\text{num\_rows} * \text{num\_columns} * \text{high\_threshold}}{\text{histogram\_granularity}} \quad (2)$$

Starting from the top of the histogram, an average point count of a specified number of successive bins from a starting bin is calculated (S505) and compared (S507) to the high cut threshold. If the average value does not exceed the high cut threshold, the starting bin is decremented (S509) to the next bin and the operation is proceeds to step S505. If the average of the set of successive bins exceeds the high cut threshold, the values of realism enhance luminance component 157 are clipped (S511) based on the value of that starting bin. The clipped component is then normalized (S513).

Figure 12:
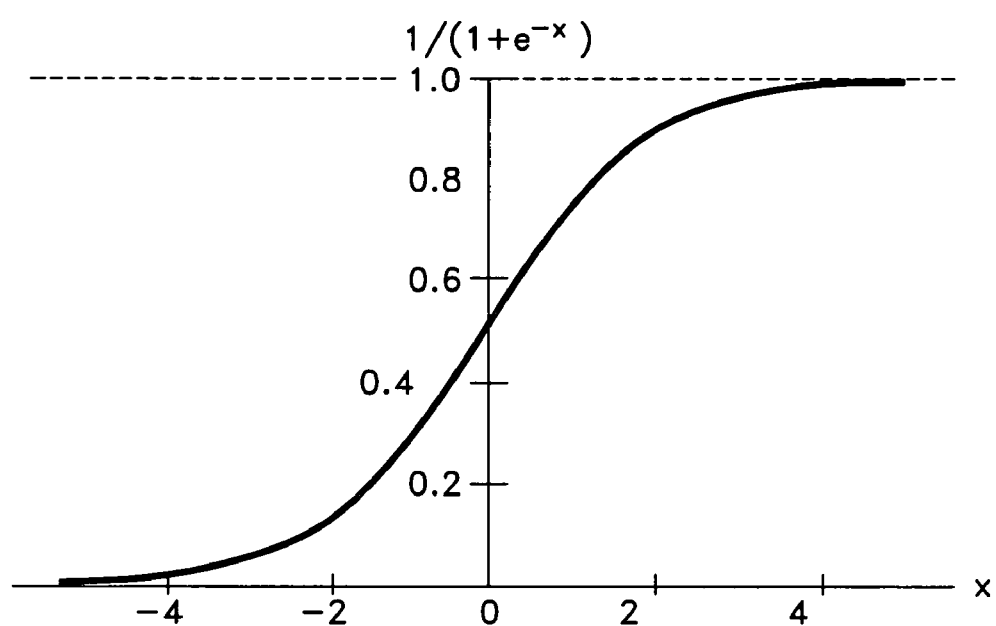
FIG. 12 is an example of a graph of a sigmoid curve.

Reverting to FIG. 2E, Apply Sigmoid Curve Module 129 applies (S247) a subtle sigmoid curve (also referred to as an S-curve) to the output of S245. The application of a sigmoid curve helps to remove a "hazy" appearance and restore clarity. The sigmoid curve starts its rise slowly, rises more quickly in the center and then tapers off at the end, in an "S" fashion. (See FIG. 12 for an example of a graph of a sigmoid curve). When applied, for example, to the lightness component of an image, it will tend to compress the bright and dark areas of the image and expand the mid-range areas.

At step S249, Histogram Tail Clipping (Low End) Module 131 clips the low end of the result of S247. Specifically, a histogram of the resultant component output from S247 is generated. A lightness key based on a median bin of the histogram is determined, and a predetermined key range, having a top key value and a bottom key value, is input. A low threshold is set equal to maximum threshold 141 if the lightness key is greater than the top key value, to minimum threshold 140 if the lightness key is less than the bottom key value, and to a middle value if the lightness key is between the bottom key value and the top key value. The proportion of the middle value between the minimum threshold and the maximum threshold equals the proportion of the lightness key between the bottom key value and the top key value. Similar to the calculation of the high cut threshold described above, a low cut threshold is calculated from the low threshold by taking into account the size of the resultant component from S247 and the granularity of the histogram. The values of the resultant component are clipped based on the value of the starting bin whose average point count minimally exceeds the low cut threshold, and the result is normalized to produce restored luminance component 159.

Figure 6A:
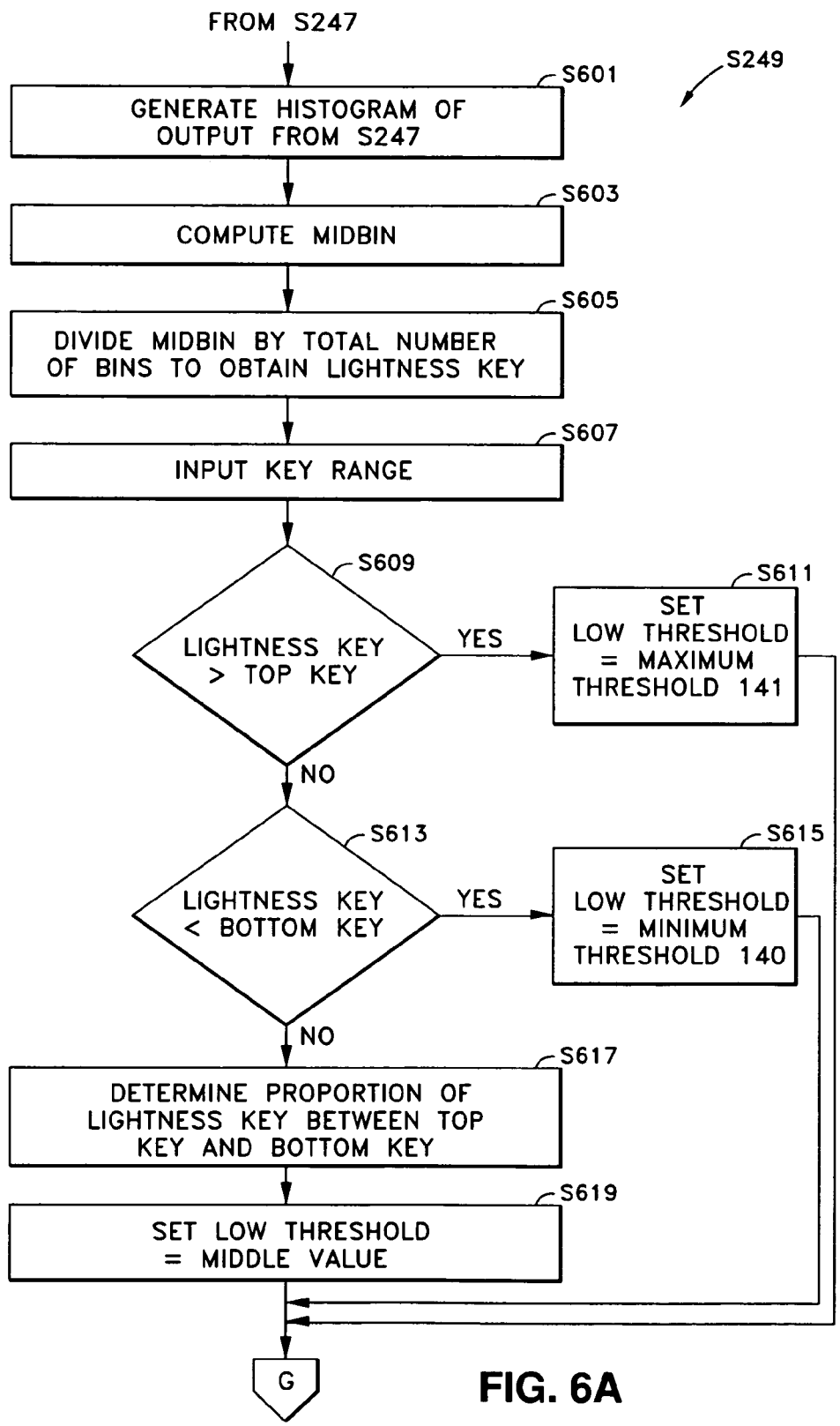
FIGS. 6A and 6B are process flowcharts of a Histogram Tail Clipping (Low End) operation performed according to one embodiment of the present invention.
Figure 6B:
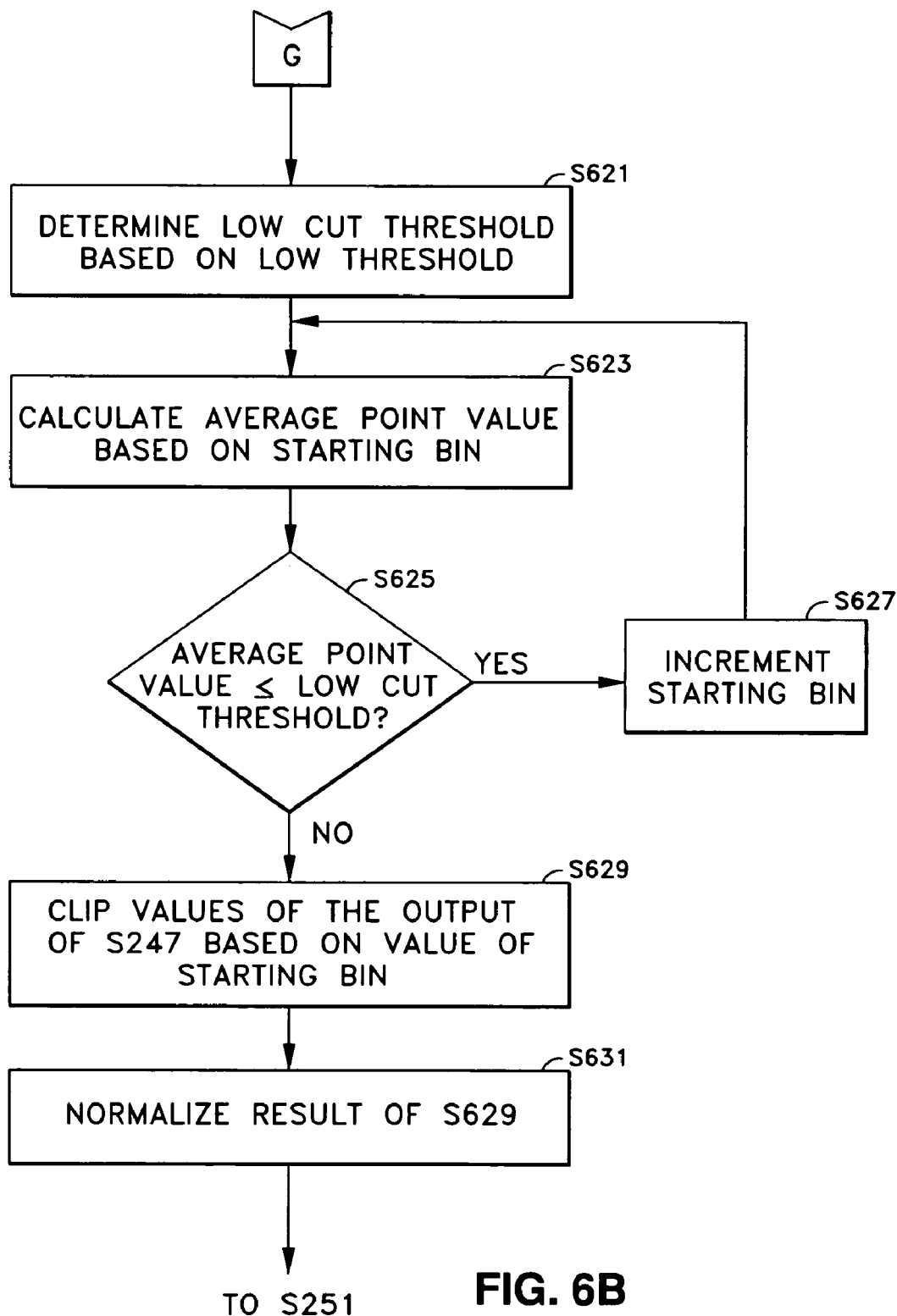

FIG. 6 is a more detailed depiction of operations performed by Histogram Tail Clipping (Low End) Module 131, at S249.

First, a histogram of the output of S247 is generated (S601). The "midbin" of the histogram (the bin that has as many points above it as below it) is computed (S603). Dividing (S605) this value by the total number of bins in the histogram results in a number between 0 and 1, which is used as the lightness key. A key range, from medium-dark to medium-bright, is determined through empirical testing. The key range is defined by a bottom key value and a top key value. At step S607, the predetermined key range is input, thus defining the bottom key value and the top key value used in the processing below.

Minimum threshold 140 and maximum threshold 141 (user input between 0 and 1) are values chosen as a reasonable threshold range where clipping will be attempted. This is similar to top-clipping described above, but a threshold range is used instead of a single value. The lightness key is then used to compute the low threshold within the threshold range. If the lightness key value is greater than the top key value (S609), then the low threshold is set (S611) to maximum threshold 141. If the lightness key value is less than the bottom key value (S613), then the low threshold is set (S615) to minimum threshold 140. Otherwise, the proportion of the lightness key value between the top and bottom key values is determined (S617). The low threshold is set (S619) to a middle value, where the proportion of the middle value between the minimum threshold and the maximum threshold equals the proportion of the lightness key between the bottom key value and the top key value. The low cut threshold value is determined (S621) as in the top-clip case (taking into account the image size and histogram granularity), with the following equation:

$$low\_cut\_threshold = \frac{num\_rows * num\_columns * low\_threshold}{histogram\_granularity} \quad (3)$$

Starting from the bottom of the histogram, an average point count of a specified number of successive bins from a starting bin is calculated (S623) and compared (S625) to the low cut threshold. If the average value does not exceed the low cut threshold, the starting bin is incremented (S627) to the next bin and the operation is proceeds to step S623. If the average of the set of successive bins exceeds the low cut threshold, the values of the output of S247 are clipped (S629) based on the value of that starting bin. The clipped result is then normalized (S631) to produce restored luminance component 159.

The previous three processes (top/bottom histogram clipping and S-curve mapping) can be reordered to suit preference, e.g. top-clip/bottom-clip/S-curve, or S-curve/top-clip/bottom-clip, or other orders. For example, in the case that the bottom-clip is performed first, realism enhanced luminance component 157 is input at step S249 (S601).

Reverting back to FIG. 2E, at step S251, tone-compressed image 161 is obtained by mapping luminance of the HDR image using restored luminance component 159 and adjusting saturation based on a saturation component of the HDR image. One way to map luminance of the HDR image is by replacing the lightness component of log-norm HDR HSV image 143 with restored luminance component 159 and scaling the log-norm saturation component 147 accordingly. This process is represented in FIG. 1 and detailed in FIG. 7.

Figure 7:
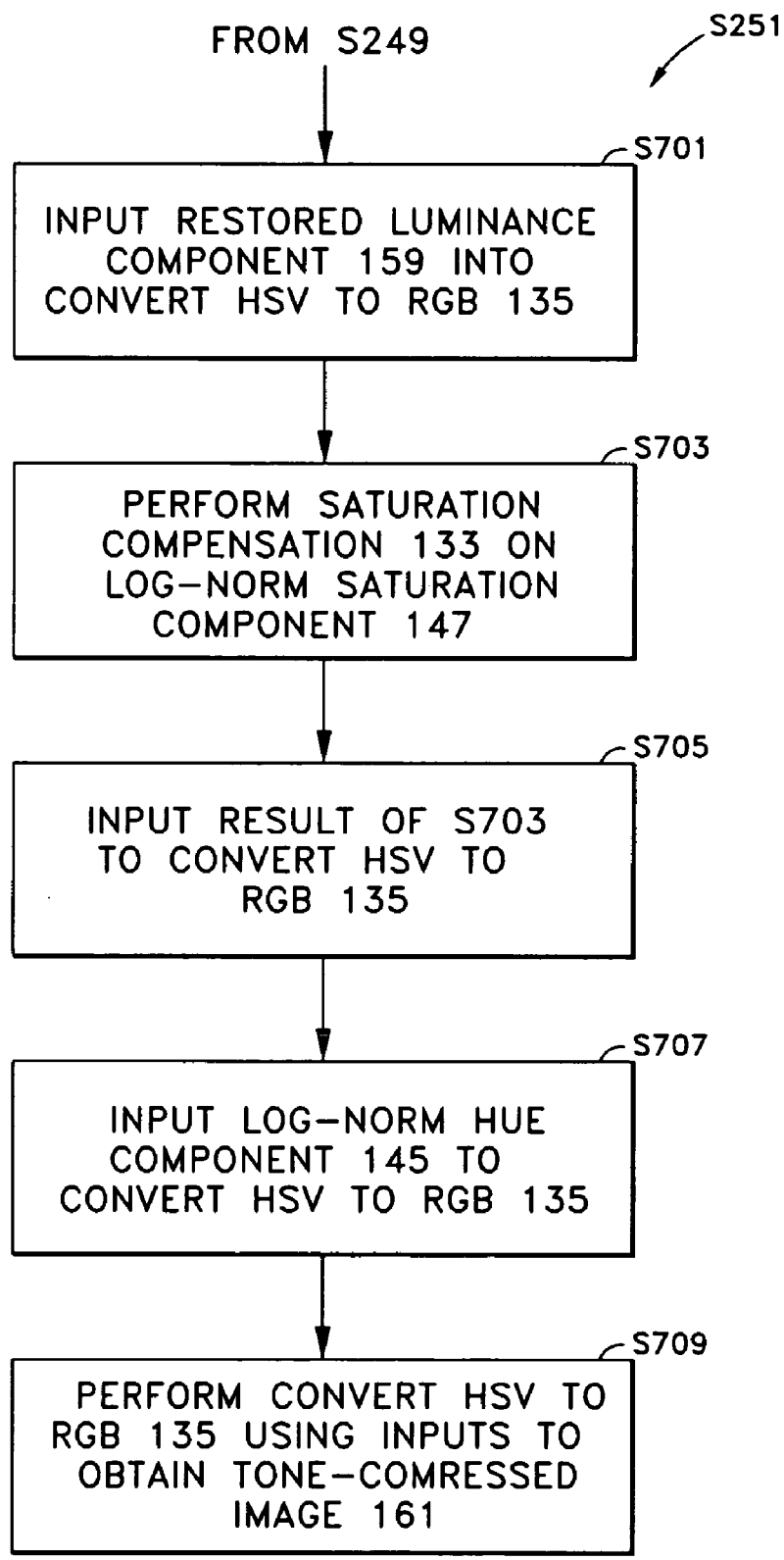
FIG. 7 is a process flowchart of one method of obtaining a tone-compressed image using a restored luminance component according to one embodiment of the present invention.

Referring now to FIG. 7, restored luminance component 159 is input (S701) into Convert HSV to RGB Module 135. Saturation Compensation Module 133 is performed (S703) by applying a gamma curve followed by a linear scale factor on log-norm saturation component 147, and the result is input (S705) into Convert HSV to RGB Module 135. Log-norm hue component 145 is input (S707) into Convert HSV to RGB Module 135. Convert HSV to RGB Module 135 then converts (S709) the inputs into tone-compressed image 161, which is in RGB format. A gamma curve (not shown) can be applied to tone-compressed image 161 to compensate for display on a particular output device.

Figure 8:
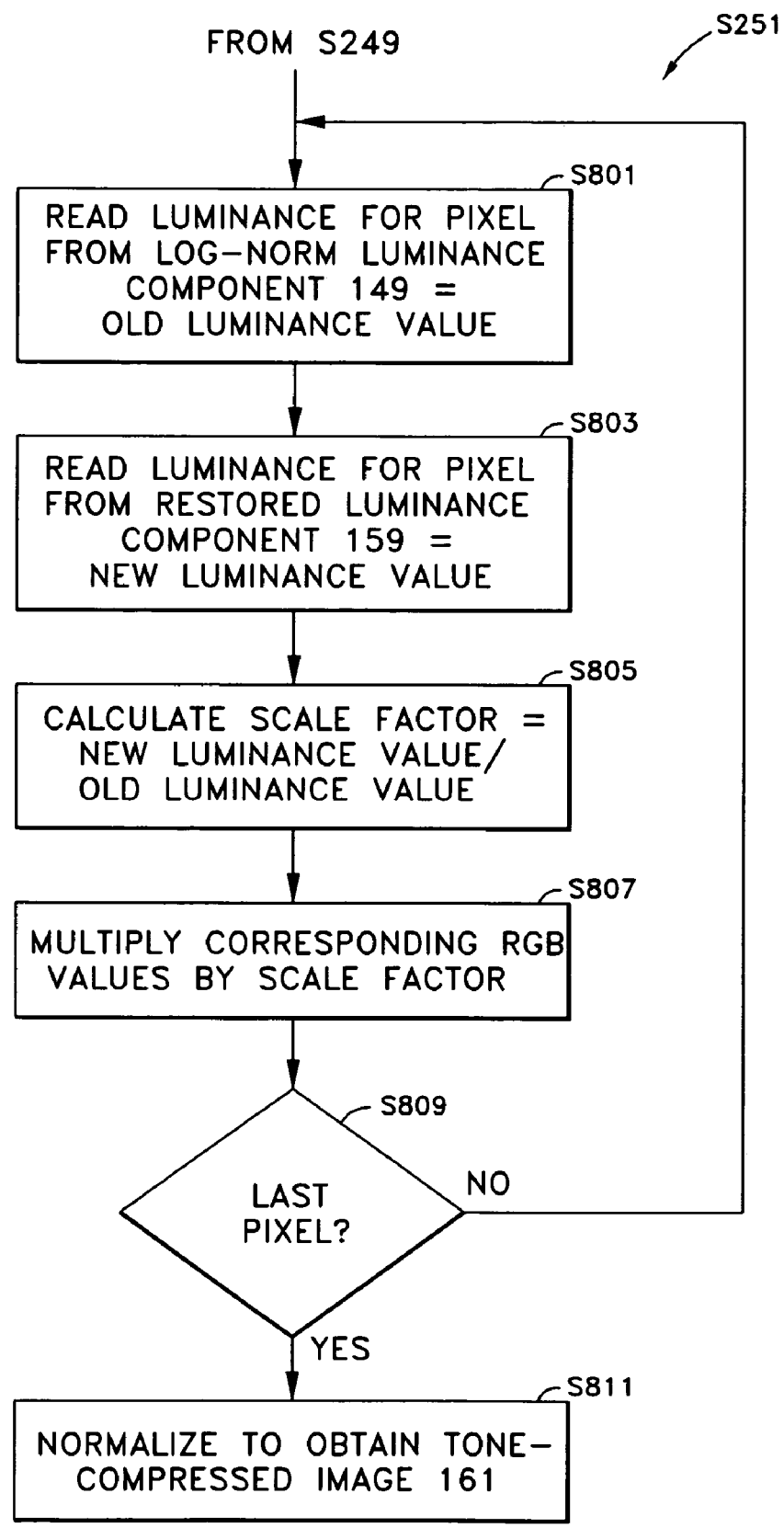
FIG. 8 is a process flowchart of one method of obtaining a tone-compressed image by scaling components of the HDR image according to one embodiment of the present invention.

Another way to map luminance of the HDR image is to use restored luminance component 159 to properly scale the original RGB values of the log-norm image that is output from Log-Norm Module 109. For example, FIG. 8 depicts a process flowchart of another method of obtaining tone-compressed image 161 at step S251. At step S801, the luminance value for a pixel is read from log-norm luminance component 149 to obtain an old luminance value. The luminance value for the pixel is then read (S803) from restored luminance component 159 to obtain a new luminance value. A scale factor for the pixel is calculated (S805) by dividing the new luminance value by the old luminance value. The pixel's corresponding RGB values, obtained from an original log-norm RGB image (not shown) output from Log-Norm Module 109 in FIG. 1, are multiplied (S807) by the scale factor to scale the pixel. The process is repeated (S809) for each pixel to obtain a scaled RGB image. The scaled RGB image is normalized (S811) to obtain tone-compressed image 161.

Although this invention has been described with the aid of certain specific embodiments, many additional modifications and variations would be apparent to those skilled in the art. It is therefore to be understood that this invention may be practiced otherwise than as specifically described. Thus, the above-described embodiments of the invention should be considered in all respects as illustrative and not restrictive, the scope of the invention to be determined by the claims and their equivalents.

What is claimed is:

1. A method for tone mapping a high dynamic range image, the method comprising:
   obtaining a log-norm luminance component based on a normalized logarithm calculated from the high dynamic range image;
   flattening the log-norm luminance component using a plurality of incrementally-spaced adaptation levels weighted by a diminishing factor to create a flattened luminance component;
   restoring visual cues in the flattened luminance component by injecting a proportion of values of the log-norm luminance component, applying histogram tail clipping, and applying a sigmoid curve mapping, to create a restored luminance component; and
   obtaining a tone-compressed image by mapping luminance of the high dynamic range image using the restored luminance component and adjusting saturation based on a saturation component of the high dynamic range image.

2. The method of claim 1, wherein flattening the log-norm luminance component includes:
   obtaining a first adaptation level by reducing the log-norm luminance component to create a first reduced image and expanding the first reduced image to a size of the log-norm luminance component; and
   obtaining a second adaptation level by reducing the first reduced image to create a second reduced image and expanding the second reduced image to the size of the log-norm luminance component.

3. The method of claim 1, wherein the proportion of values of the log-norm luminance component is based on a predesignated realism factor and a reflectance contribution of the adaptation levels, and the reflectance contribution is determined from the number of adaptation levels and the diminishing factor.

4. The method of claim 1, wherein applying histogram tail clipping includes:

generating a histogram of a realism enhanced luminance component based on the step of injecting a proportion of values of the log-norm luminance component;

calculating an average point count of bins in a predetermined range from each of a plurality of starting bins at a high end of the histogram; and clipping values of the realism enhanced luminance component based on a value of a starting bin whose average point count minimally exceeds a high cut threshold.

5. The method of claim 1, wherein applying histogram tail clipping includes:

generating a histogram of a realism enhanced luminance component based on the step of injecting a proportion of values of the log-norm luminance component;

determining a lightness key based on a median bin of the histogram;

determining a key range defined by a bottom key value and a top key value;

setting a low cut threshold based on a predesignated maximum threshold if the lightness key is greater than the top key value, on a predesignated minimum threshold if the lightness key is less than the bottom key value, and on a middle value if the lightness key is between the bottom key value and the top key value, wherein the proportion of the middle value between the minimum threshold and the maximum threshold equals the proportion of the lightness key between the bottom key value and the top key value;

calculating an average point count of bins in a predetermined range from each of a plurality of starting bins at a low end of the histogram; and clipping values of the realism enhance luminance component based on a value of a starting bin whose average point count minimally exceeds the low cut threshold.

6. The method of claim 1, wherein obtaining a tone-compressed image includes:

scaling components of the high dynamic range image using the restored luminance component.

7. The method of claim 1, wherein obtaining a tone-compressed image includes:

replacing a luminance component of the high dynamic range image with the restored luminance component; and adjusting saturation by applying a gamma curve and a linear scale factor.

8. The method of claim 1, wherein flattening the log-norm luminance component includes padding each dimension of the log-norm luminance component to a larger size of 2n+1, where n is a positive integer, and removing the padding from the flattened luminance component.

9. The method of claim 2, wherein the first reduced image is reduced from the log-norm luminance component by the same factor as the second reduced image is reduced from the first reduced image.

10. The method of claim 2, wherein reducing the log-norm luminance component includes applying a first small convolution filter to the log-norm luminance component and removing every other row and every other column, and wherein expanding the first reduced image includes adding a blank row between each row of the first reduced image and a blank column between each column of the first reduced image, applying a second small convolution filter, and multiplying each pixel by 4.

11. The method of claim 2, wherein flattening the log-norm luminance component further includes:

subtracting the first adaptation level from the log-norm luminance component to obtain a first reflectance map, and multiplying the first reflectance map by a first weight to obtain a first weighted reflectance map;

subtracting the second adaptation level from the log-norm luminance component to obtain a second reflectance map, and multiplying the second reflectance map by a second weight to obtain a second weighted reflectance map; and accumulating the first weighted reflectance map with the second weighted reflectance map to create the flattened luminance component;

wherein the second weight equals the product of the first weight and the diminishing factor.

12. The method of claim 2, further comprising:

obtaining additional adaptation levels until a size of a current reduced image reaches a lower limit.

13. The method of claim 3, wherein injecting a proportion of values of the log-norm luminance component includes:

obtaining the ratio of the product of the predesignated realism factor and the reflectance contribution to the value of one minus the predesignated realism factor;

setting the proportion of values of the log-norm luminance component based on the ratio.

14. The method of claim 4, wherein the high cut threshold is determined from an image size, a granularity of the histogram, and a predesignated high threshold value.

15. The method of claim 11, wherein flattening the log-norm luminance component further includes:

tracking a reflectance contribution of the adaptation levels by accumulating the first weight and the second weight.

16. An apparatus for tone mapping a high dynamic range image, the apparatus comprising:

a luminance extraction means for obtaining a log-norm luminance component based on a normalized logarithm calculated from the high dynamic range image;

a flattening means for flattening the log-norm luminance component using a plurality of incrementally-spaced adaptation levels weighted by a diminishing factor to create a flattened luminance component;

a visual cues restoring means for restoring visual cues in the flattened luminance component by injecting a proportion of values of the log-norm luminance component, applying histogram tail clipping, and applying a sigmoid curve mapping, to create a restored luminance component; and a tone-compression means for obtaining a tone-compressed image by mapping luminance of the high dynamic range image using the restored luminance component and adjusting saturation of the mapped high dynamic range image.

17. Computer-executable instructions stored on a computer-readable medium, the computer-executable instructions executable to perform tone mapping of a high dynamic range image, said computer-executable process steps comprising process steps executable to perform a method according to any of claims 1 to 15.

18. A computer-readable medium that stores computer-executable process steps, said computer-executable process steps for tone mapping a high dynamic range image, the computer-executable instructions executable to perform a method according to any of claims 1 to 15.

19. An apparatus for tone mapping a high dynamic range image, the apparatus comprising:

a computer-readable memory that stores computer-executable process steps executable to perform a method according to any of claims 1 to 15; and a processor coupled to the memory that executes the process steps stored in said program memory.

* * * * *